(12) United States Patent
Barrenscheen et al.

(10) Patent No.: US 9,442,478 B2
(45) Date of Patent: Sep. 13, 2016

(54) SYSTEMS, CIRCUITS AND A METHOD FOR GENERATING A CONFIGURABLE FEEDBACK

(75) Inventors: Jens Barrenscheen, Munich (DE); Laurent Beaurenaut, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 1323 days.

(21) Appl. No.: 13/308,054

(22) Filed: Nov. 30, 2011

(65) Prior Publication Data

US 2013/0135030 A1 May 30, 2013

(51) Int. Cl.
*G05F 1/00* (2006.01)
*G05B 19/042* (2006.01)

(52) U.S. Cl.
CPC ................. *G05B 19/0428* (2013.01)

(58) Field of Classification Search
CPC .......................... G05B 19/0428; G05B 19/05
USPC ......... 327/108–111, 355, 363, 379, 518, 519
See application file for complete search history.

(56) References Cited

U.S. PATENT DOCUMENTS

| 6,876,704 | B2 | 4/2005 | LaRocca et al. | |
| 6,924,678 | B2 | 8/2005 | Starr | |
| 7,394,287 | B1 | 7/2008 | Hutton | |
| 7,453,285 | B2 | 11/2008 | Kiel et al. | |
| 2009/0002135 | A1 | 1/2009 | Dold et al. | |
| 2010/0201279 | A1* | 8/2010 | Zhao | 315/185 R |
| 2013/0285553 | A1* | 10/2013 | Shimomura et al. | 315/113 |

FOREIGN PATENT DOCUMENTS

| CN | 1518706 A | 8/2004 |
| CN | 1610261 A | 4/2005 |
| CN | 101632065 A | 1/2010 |
| DE | 102007029423 A1 | 1/2009 |
| JP | 2008289151 A | 11/2008 |

* cited by examiner

*Primary Examiner* — William Hernandez
(74) *Attorney, Agent, or Firm* — Slater Matsil, LLP

(57) ABSTRACT

A system can generate a configurable feedback. The system includes a number of circuitries that are coupled to a number of drivers and connected to each other in a chain via a single-wire connection. Control circuitry is connected to the plurality of circuitries and adapted to output configuration data to at least one circuitry of the plurality of circuitries to configure a feedback signal to be delivered by the plurality of circuitries to the control circuitry via the single-wire connection.

22 Claims, 10 Drawing Sheets

SYSTEMS, CIRCUITS AND A METHOD FOR GENERATING A CONFIGURABLE FEEDBACK

TECHNICAL FIELD

The invention relates to systems, circuitries and a method for generating a configurable feedback, in particular in safety-critical power systems with power switches.

BACKGROUND

Safety engineering is a growing field in which engineers use redundancy techniques in order to mitigate adverse consequences if an error occurs. For example, space vehicles and aircrafts include redundant systems so that if an engine control component fails during flight, for example, another engine control component can be activated to allow the aircraft to land safely.

In a similar regard, timed input/output (I/O) signals in safety conscious systems can be generated and then subsequently checked to ensure they were actually delivered correctly. This can be useful in any number of applications. For example, in an automotive system, if an output drive signal (e.g., sparkplug signal from an engine controller) is provided to an automobile's engine, a feedback signal (which is derived from the output drive signal that was actually delivered to the engine) can be compared with the original output drive signal to determine whether the output drive signal was, in fact, delivered correctly. Thus, if there is a "bad" connection between the engine controller and the engine itself (or if some other error event occurs), a comparison of the original drive signal and the feedback signal can detect this error, thereby allowing a control system to notify the driver, for example, by illuminating a "check engine" light on the driver's dashboard. In this way, a driver can be informed that an engine problem (e.g., a sparkplug misfire) has occurred, and can then get the vehicle serviced to remedy any corresponding problems.

In safety-critical power systems with power switches (e.g., metal-oxide-semiconductor field-effect transistors (MOSFETs) or insulated gate bipolar transistors (IGBTs)) there is the need to analyze functional blocks in the power system before starting the operation of the system to avoid damages in case of the malfunction of some functional blocks. Furthermore, diagnosis capability is needed during runtime to detect aging effects or analyze sudden failures.

A standard output of a normal control device is not capable of driving directly the control input (gate) of a power switch. Therefore, a gate driver component with its own power supply is needed to amplify the control signals and to adapt them to the needs of the power switches. To avoid losses and to ensure a correct switching behavior, the gate driver components are normally located near to the power switch.

In some cases, the gate driver component introduces a galvanic isolation barrier between the control device and the power switch since they do not refer to the same potential. This results in the risk of corruption of the ("low-power") control signals between the control device(s) and the gate driver components and even undesired switching of the power switches. An option for monitoring the data consistency could be to build a parallel loop back of the control signals received by the gate driver component to the control device. Normally, however, the costs of the additional input pins at the control device are too high. Other known solutions are not flexible enough, i.e., they can cover only a subset or an aspect of the data volume to be monitored.

Therefore, there, e.g., exists a need for a system for monitoring data consistency, in particular for safety-critical power systems, which is reliable, flexible and cost-effective.

SUMMARY OF THE INVENTION

In accordance with an aspect of the invention, a system for generating a configurable feedback is provided. The system comprises a plurality of circuitries which are coupled to a plurality of drivers and connected to each other in a chain via a single-wire connection. A control circuitry is connected to the plurality of circuitries and adapted to output configuration data to at least one circuitry of the plurality of circuitries to configure a feedback signal to be delivered by the plurality of circuitries to the control circuitry via the single-wire connection.

In accordance with a further aspect of the invention, a method for generating a configurable feedback is provided. The method comprises receiving a status input signal, receiving a control signal, receiving configuration data, and logically combining the status input signal and the control signal. The received configuration data is outputted based on one of the following as status output signal: the status input signal, the control signal or the result of the logical combining of the status input signal and the control signal.

Further features, aspects and advantages of the present invention will become apparent from the following detailed description of the invention made with reference to the accompanying drawings.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated as they become better understood by reference to the following detailed description.

DETAILED DESCRIPTION OF ILLUSTRATIVE EMBODIMENTS

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

The invention relates to systems, circuitries and a method for generating a configurable feedback, in particular in safety-critical power systems with power switches. The data contained in the configurable feedback may comprise status or signature data. Further, a dedicated line, e.g., single-wire connection, may be provided for the status or signature data such that feedback data may be provided in a time-continuous way. A data line, e.g., a single-wire connection, may be shared with other data communications using, e.g., time division multiplex transmission. Dedicated time-slots may be provided for the transmission of status or signature data such that feedback data may be provided in a time-discrete way. In the following, exemplary embodiments for both of the abovementioned approaches will be illustrated.

Figure 1:
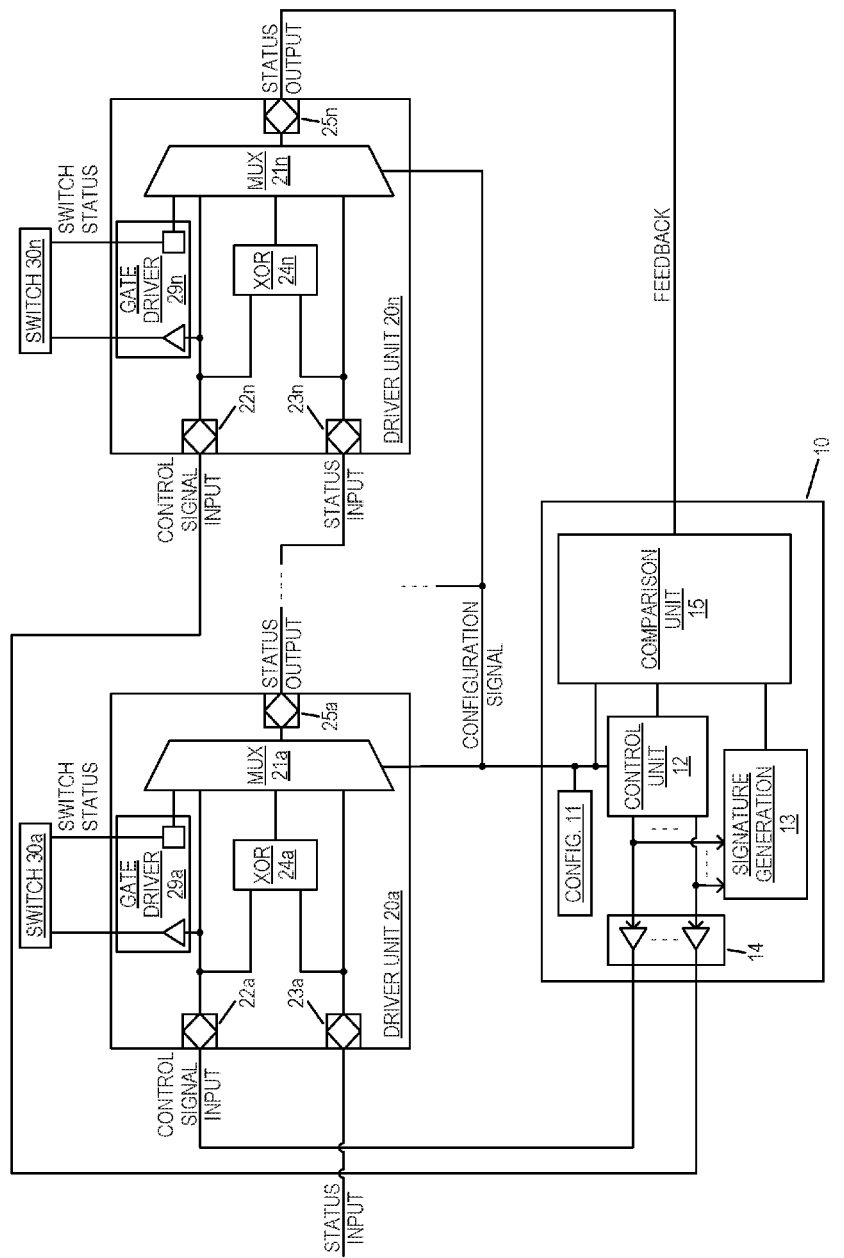
FIG. 1 exemplarily shows a simplified schematic diagram of a system according to an embodiment of the invention.

FIG. 1 exemplarily shows a simplified schematic diagram of a system according to an embodiment of the invention. The system comprises a control device 10 and a plurality of driver units 20a-20n which are connected to the control device.

The control device 10 is configured to control and monitor the plurality of driver units 20a-20n. For this purpose the control device comprises a configuration signal generator 11, a control unit 12 connected to the configuration signal generator 11, a control signal output 14 connected to the control unit 12, a signature generator 13 connected to the control unit 12, and a comparison unit 15 connected to the control unit 12, the configuration signal generator 11 and the signature generator 13.

Each of the driver units 20a-20n is allocated to one of the plurality of switches 30a-30n and configured to drive the one associated switch 30 on the basis of a control signal received from the control unit.

Each of the driver units 20a-20n comprises a control signal input 22a-22n, a status input 23a-23n, a status output 25a-25n, a logic gate 24a-24n, e.g. an XOR gate, having its inputs connected to the control signal input 22a-22n and the status input 23a-23n, a multiplexer 21a-21n, and a gate driver 29a-29n.

The gate driver 29a-29n has a first input connected to the control signal inputs 22a-22n, a first output connected to the associated switch 30a-30n, a second output connected to an input of the multiplexer 21a-21n, and a further connection to the switch for receiving a switch status of the switch 30a-30n.

The multiplexer 21a-21n has its output connected to the status output 25a-25n and its inputs connected to the control signal input 22a-22n, the status input 23a-23n, the output of the XOR gate 24a-24n, and the second output of the gate driver 29a-29n.

The control unit 12 may generate a separate control signal, e.g., a Pulse Width Modulation (PWM) signal, for each of the driver units 20a-20n. The control signals are transmitted, via the control signal output 14 of the control device 10, to the respective driver units 20a-20n. The gate drivers 29a-29n of the driver units 20a-20n respectively amplify and/or convert the received control signal to generate a driver signal which is transferred to the switch 30a-30n connected to the respective gate driver 29a-29n. The gate driver 29a-29n may also be configured to determine an actual driver status (such as switch conducting or blocked) by analyzing the gate voltage, the source current, the drain voltage or other values of the associated switch and generate a driver status signal based on the determined driver status. Typical driver status signals are, "power supply OK", temperature, switch conducting or blocked, load overcurrent or overvoltage.

The switches 30a-30n (also called power switches) may energize loads, for example, or generally perform control tasks on the basis of the received driver signals.

The status inputs 23a-23n and the status outputs 25a-25n are provided to enable a feedback signal to be delivered from the driver units 20a-20n back to the control device 10. For this reason, the driver units 20a-20n are connected in series via their respective status inputs and outputs, i.e., the driver units 20a-20n are connected in the form of a chain, wherein the status output 25 of one driver unit is connected to the status input 23 of the next driver unit in the series or chain, respectively. The status input 23a of the driver unit 20a which is the first in the series is connected to a defined potential. In order to avoid a floating potential at the status input of the first driver unit 20a, the driver units 20a-20n may be set up in such a manner that, if a status signal is not received at the status input 23a-23n, the status signal is replaced by a predetermined standard signal, e.g., ground potential. This may be effected by providing a pull-up or pull-down resistor which pulls an open status input 23, or a status input 23 which has not been connected, to a fixed potential and thus ensures a standard value at this input. The status output 25n of the driver unit 20n which is last in the series is connected to the comparison unit 15 of the control device 10. Thus a single-wire feedback line connecting the control device 10 with all driver units 20a-20n is formed.

According to an embodiment of the invention, the driver units 20a-20n comprise configuration means, in particular multiplexers 21a-21n, to select which type of feedback signal is output at their status outputs 25a-25n. The multiplexers 21a-21n are controlled by a configuration signal received from the control device 10. Accordingly, the configuration signal generator 11 of the control device 10 generates a configuration signal for configuring the feedback signal which the comparison unit 15 of the control device 10 receives from the driver units 20a-20n via the single-wire feedback line.

In this embodiment of the invention, each of the multiplexers 21a-21n may receive the following signals at its inputs:

the status signal received at the status input 23;

the control signal received at the control signal input 22 from the control device 10;

a logical combination of the status signal and the control signal received at respective inputs of the driver unit;

a driver status signal generated by the gate driver 29 indicating a status of the gate driver 29 and/or associated switch 30.

Consequently, a plurality of types of feedback signals are configurable by providing certain configuration signals to the multiplexers 21a-21n of the driver units 20a-20n. An exemplary set of feedback signal types is illustrated in the following:

A) A signature signal based on a combination of the control signals of all driver units;

B) The individual control signal received by one specific driver unit;

C) An individual driver status signal of a driver associated to one specific driver unit.

A) A signature signal based on a combination of the control signals of all driver units is generated to provide feedback from and/or monitor the control lines of all driver units. A simple signature generation may be based on parity logic as it is independent of time and location. The embodiment of FIG. 1 shows an implementation of a signature generation based on XOR gates. To provide a signature signal based on a combination of the control signals of all driver units, the configuration signal transmitted by the control device controls each multiplexer 21a-21n to forward and output the signal received from the output of the corresponding XOR gate 24a-24n. Thus, the individual control signals received by all the driver units 20a-20n are XORed to generate the signature signal, as each driver unit 20a-20n logically combines the status/signature signal received at its status input 23a-23n and the control signal received at the control signal input 22a-22n and transmits the resulting signal to the status input of the next driver unit in the chain or to the control device if the driver unit is the last one in the chain. Accordingly, the feedback signal delivered to the control device comprises a logic combination of the control signals of all driver units 20a-20n. Thus, a feedback from all driver units 20a-20n can be provided to the control device 10 via the single-wire feedback line.

B) The individual control signal received by one specific driver unit is forwarded to the control device 10 to provide feedback from and/or monitor the control line of the one specific driver unit. For this, the configuration signal sent by the control device 10 causes the one specific driver unit to forward the control signal received at its control signal input to its status output and all driver units which are arranged subsequently to the one specific driver unit in the chain (i.e., are located after the one specific driver unit in the chain) to forward the signal received at their status inputs to their status outputs without modification. In this case, only the control signal received by the one specific driver unit is provided as feedback signal to the control device 10 via the single-wire feedback line. The comparison unit 15 of the control device 10 may then determine the loop-timing between the control signal for the one specific gate driver which was generated by the control device 10 and the feedback signal received via the chain of driver units 20a-20n. The functionality of the comparison unit 15 will be described below in more detail. In general, knowledge of this timing is not required for all driver units 20a-20n in parallel. Therefore, the driver units 20a-20n can be "scanned" one after the other under the control of the control device using the single-wire feedback, which enables diagnostic capability at low costs.

C) The individual driver status signal generated by a gate driver 29 associated to the driver unit which is connected to the one specific switch is forwarded to the control device 10 to monitor the driver status of the gate driver and/or associated switch. For this, the control device 10 sends a configuration signal which causes the driver unit connected to the one specific switch to forward the driver status signal to its status output and all driver units which are arranged subsequently to the one specific driver unit in the chain (i.e., are located after the one specific driver unit in the chain) to forward the signal received at their status inputs to their status outputs without modification. In this case, only the driver status signal generated by the gate driver of the one specific driver unit is provided as feedback signal to the control device 10 via the single-wire feedback line. Thus, the feedback signal may be used by the comparison unit 15 to determine the switching timing between the original control signal (generated by the control device 10) and the reaction of the power switch itself. In general, knowledge of this timing is not required for all switches in parallel. Therefore, the gate drivers/switches can be "scanned" one after the other under the control of the control device using the single-wire feedback, which enables diagnostic capability at low costs.

It is to be appreciated that, apart from the types of feedback signals described above, also other types of feedback signals are possible. For example, the feedback signal described under item A) may be modified in that not all driver units 20a-20n logically combine their received control signal with the received status/signature signal, but only a subset of the driver units 20a-20n, whereas all other driver units forward the received status/signature signal without modification. Accordingly, the feedback signal delivered to the control device 10 may comprise a signature signal (i.e., logical combination of the control signals) of only a subset of the driver units 20a-20n.

Another option for generating a feedback signal may be implemented in a system having a slightly modified layout in comparison with the layout of the system shown in FIG. 1. A status or signature signal based on a combination of all driver status signals, i.e., the driver status signals of all drivers which are associated to respective driver units. For this, the multiplexer of each driver unit comprises an additional input, which receives a logical combination, e.g., a XOR combination, of the status/signature signal and the driver status signal generated by the gate driver indicating a status of the gate driver and/or the associated switch. Such a signal may be provided by an additional XOR gate receiving the status/signature signal and the driver status signal as inputs. To obtain a combination of all driver status signals, the multiplexer of each driver unit is controlled to forward the output of the additional XOR gate.

In the embodiment described above with reference to FIG. 1, separate lines are provided for transmission of status and configuration data, respectively. In an alternative embodiment of the invention, only one single-wire connection is provided for transmission of status and configuration data. In this alternative embodiment, status and configuration data are transmitted in separate allocated time-slots of a data stream transmitted via the single-wire connection. Optionally, further data may be transmitted via the single-wire connection within further time-slots which are not allocated for transmission of status or configuration data.

Thus, if the single-wire connection is continuously used for transmission of status signals (which is the case in the embodiment of FIG. 1, for example), a continuous status check during run-time is supported.

Otherwise, if the status signals are transmitted in discrete time slots within a continuous data stream (which is the case in the alternative embodiment described above), status checks can be performed at specific point in time only.

Figure 2:
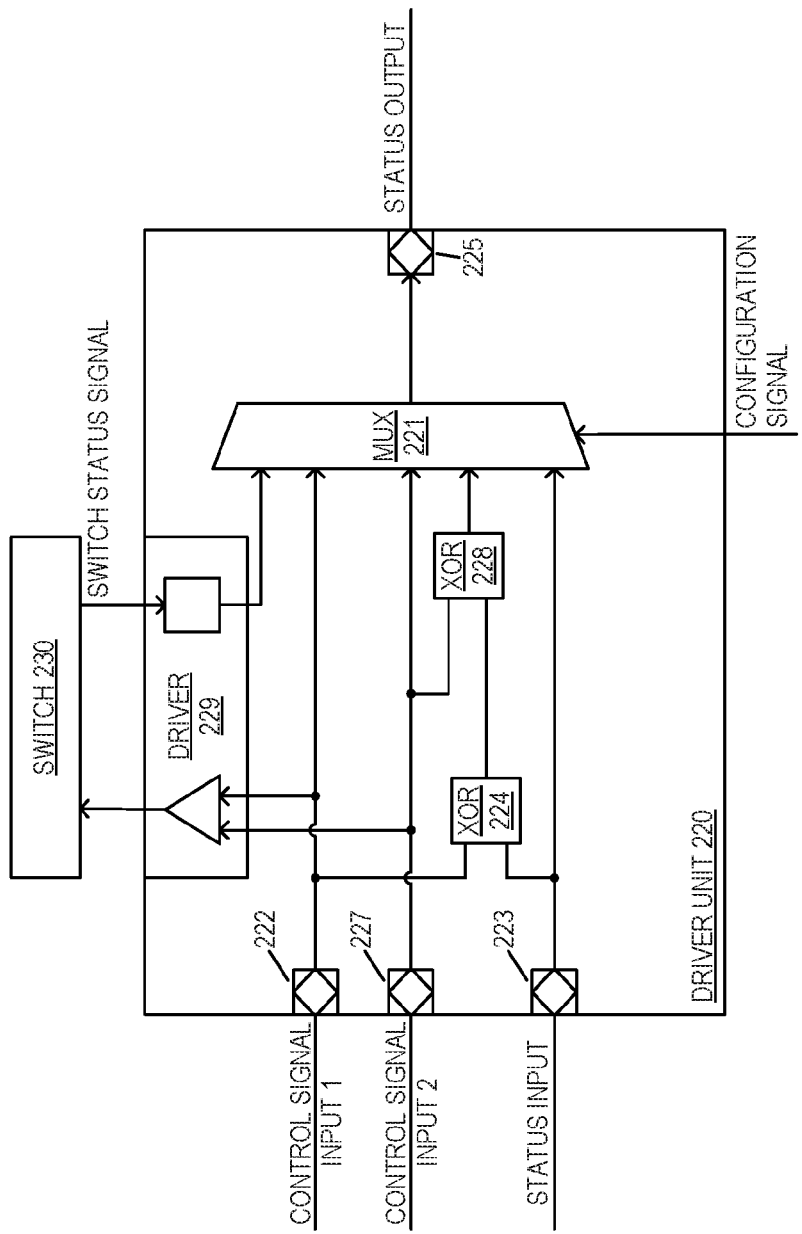
FIG. 2 exemplarily shows a simplified schematic diagram of a driver unit according to a further embodiment of the invention.

FIG. 2 exemplarily shows a simplified schematic diagram of a driver unit according to a further embodiment of the invention which is connected to an associated switch. The driver unit 220 illustrated in FIG. 2 may be used in the system depicted in FIG. 1, wherein the driver units 20a-20n are respectively replaced by the driver unit 220 of FIG. 2 and the control unit (not shown) is slightly modified as explained below.

The gate driver unit 220 of FIG. 2 has a design similar to the design of the driver units 20a-20n of FIG. 1, but receives two control signals from a control device. Accordingly, the control device 10 of FIG. 1 is modified in that the control unit is configured to generate two sets of control signals, i.e., two control signals for each drive unit, and transmits these control signals via the control signal output to the drive units.

The gate driver unit 220 comprises a first control signal input 222, a second control signal input 227, a status input 223, a status output 225, a first logic gate 224, e.g., an XOR gate, having its inputs connected to the first control signal input 222 and the status input 223, a second logic gate 228, e.g., an XOR gate, having its inputs connected to the second control signal input and the output of the first XOR gate, multiplexer 221, and a gate driver 229.

The gate driver 229 has a first and a second input connected to the first and second control signal inputs 222 and 227, a first and a second output connected to the associated switch 230, a third output connected to an input of the multiplexer 221, and a further connection to the switch for receiving a switch status of the switch 230.

The multiplexer 221 has its output connected to the status output 225 and its inputs connected to the first control signal input 222, the second control signal input 227, the status input 223, the output of the second XOR gate 228, and the third output of the gate driver 229.

The control unit may generate two control signals, e.g., PWM signals, for each driver unit 220 and transmits the two signals via its control signal output to each driver unit 220. The gate driver 229 of the driver unit 220 amplifies and/or converts the received control signals to generate a respective driver signal which is transferred to the switch 230 connected to the gate driver 229. The gate driver 229 may also be configured to determine an actual driver status (such as switch conducting or blocked) by analyzing the gate voltage, the source current, the drain voltage or other values of the associated switch and generate a driver status signal based on the determined driver status. Typical driver status signals are, "power supply OK", temperature, switch conducting or blocked, load overcurrent or overvoltage.

The status input 223 and the status output 225 are provided to enable a feedback signal to be delivered from the driver units back to the control device. For this reason, the driver units are connected in series via their respective status inputs and outputs, i.e., the driver units are connected in the form of a chain, wherein the status output 225 of one driver unit is connected to the status input 223 of the next driver unit in the series or chain, respectively. The status input of the driver unit which is the first in the series is connected to a defined potential. In order to avoid a floating potential at the status input of the first driver unit, the driver units may be set up in such a manner that, if a status or signature signal is not received at the status input 223, the status/signature signal is replaced by a predetermined standard signal, e.g., ground potential. This may be effected by providing a pull-up or pull-down resistor which pulls an open status input 223, or a status input 223 which has not been connected, to a fixed potential and thus ensures a standard value at this input. The status output 225 of the driver unit which is last in the series is connected to the comparison unit of the control device. Thus, a single-wire feedback line connecting the control device with all driver units is formed.

Also in this embodiment of the invention, each driver unit comprises configuration means, in particular a multiplexer, to select which type of feedback signal is delivered at its status output 225. The multiplexer 221 is controlled by a configuration signal received from the control device. Accordingly, the configuration signal generator of the control device generates a configuration signal for configuring the feedback signal which the comparison unit of the control device receives from the driver units via the single-wire feedback line.

In this embodiment of the invention, each multiplexer 221 may receive the following signals at its inputs:
  the status or signature signal received at the status input 223;
  a first control signal received from the control device at the first control signal input 222;
  a second control signal received from the control device at the second control signal input 227;
  a logical combination of the status/signature signal, the first control signal and the second control signal received at respective inputs of the driver unit 220;
  a driver status signal generated by the gate driver 229 indicating a status of the gate driver 229 and/or the associated switch 230.

Consequently, a plurality of types of feedback signals are configurable by providing certain configuration signals to the multiplexers 21a-21n of the driver units 20a-20n. An exemplary set of feedback signal types is illustrated in the following:

A) A signature signal based on a combination of all control signals received by the driver units (i.e., two control signals for each driver unit);

B) One individual control signal (i.e., the first or second control signal) received by one specific driver unit;

C) An individual driver status signal of a gate driver 229 associated to one specific driver unit.

It is to be appreciated that, apart from the types of feedback signals described above, also other types of feedback signals are possible. For example, the feedback signal described under item A) may be modified in that not all driver units logically combine their received control signals with the received status/signature signal, but only a subset of the driver units, whereas all other driver units forward the received status/signature signal without modification. Accordingly, the feedback signal delivered to the control device 10 may comprise a signature signal (i.e. logical combination of the control signals) of only a subset of the driver units.

Another option for generating a feedback signal may be implemented in a system having a slightly modified layout in comparison with the layout of a system comprising a plurality of driver units according to the embodiment shown in FIG. 2. A status or signature signal based on a combination of all driver status signals, i.e., the driver status signals of all gate drivers which are associated to respective driver units. For this, the multiplexer of each driver unit comprises an additional input, which receives a logical combination, e.g., a XOR combination, of the status/signature signal and the driver status signal generated by the gate driver indicating a status of the gate driver and/or associated switch. Such a signal may be provided by an additional XOR gate receiving the status/signature signal and the driver status signal as inputs. To obtain a combination of all driver status signals, the multiplexer of each driver unit is controlled to forward the output of the additional XOR gate.

According to further embodiments of the invention, the driver units may also receive more than two control signals from the control device. Also in this case, the configurable feedback may be one of the following feedback signal types:

A) A signature signal based on a combination of all control signals received by the driver units;

B) One individual control signal received by one specific driver unit;

C) An individual driver status signal of a driver associated to one specific driver unit;

D) A status/signature signal based on a combination of all driver status signals.

Figure 3:
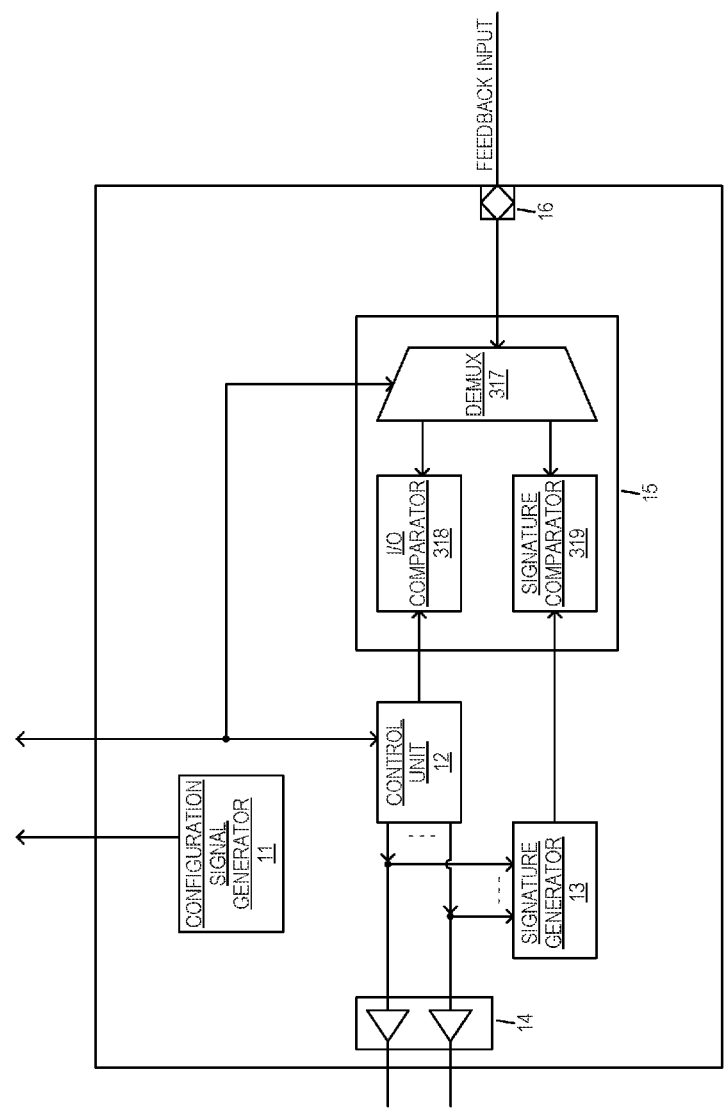
FIG. 3 shows an preferred embodiment of the control device of the system shown in FIG. 1.

FIG. 3 shows a preferred embodiment of the control device of the system shown in FIG. 1. In particular, the comparison unit 15 is shown in more detail in FIG. 3, whereas all other parts of the control device 10 are depicted without modification. The comparison unit 15 may comprise a demultiplexer 317, an input-output (I/O) comparator 318 and a signature comparator 319 in this embodiment.

As already described with reference to FIG. 1, the control device 10 controls a plurality of driver units by outputting at least one separate control signal to each driver unit. These control signals are also transmitted to the signature generator 13 which generates a reference signature signal. The configuration signal generator 11 generates a configuration signal for configuring the feedback delivered from the driver units to the feedback input 16 of the control device 10.

The demultiplexer 317 has a first input connected to the feedback input 16, a second input connected to the configuration signal generator 11, a first output connected to the I/O comparator 318 and a second output to the signature comparator 319. The I/O comparator 318 is further connected to the control unit 12 and the signature comparator 319 is further connected to the signature generator 13.

The demultiplexer 317 is controlled by the configuration signal of the configuration signal generator 11 and the demultiplexer 317 outputs the feedback signal received from the feedback input 16 either to the I/O comparator 318 or the signature comparator 319 based on the configuration signal. In the following, some examples based on the exemplary feedback signal types specified above with reference to FIG. 1 are given:

I) If the feedback signal is of type A (signature signal), the configuration signal (which is used to configure the feedback signal) controls the multiplexer to output the received feedback signal to the signature comparator 319.

II) If the feedback signal is of type B or C (individual control signal or individual driver status signal) the configuration signal controls the multiplexer to output the received feedback signal to the I/O comparator 318.

I) The signature comparator 319 receives a reference signature signal received from the signature generator 13 and the feedback signal (i.e., the signature signal generated by the driver units) and compares both received signals. The signature generator logically combines the control signals sent to the driver units in the same way as the driver units do. Thus, the feedback signal and the reference signature signal have a predetermined relationship unless an unexpected event such as a loose connection, a faulty transistor, a power supply failure, or an alpha-particle striking the control device, for example, occurs. In this case the control device may selectively assert an error signal, such as an interrupt, or initiate a predetermined action.

II) The I/O comparator 318 receives a reference signal from the control unit (e.g., the individual control signal sent to the specific driver unit which is to be checked) and the feedback signal (i.e., the individual control signal or individual driver status signal) from the demultiplexer and compares both received signals. If the feedback signal and the reference signal do not have a predetermined relationship, the control device may selectively assert an error signal, such as an interrupt, or initiate a predetermined action.

In some embodiments of the invention, the comparison unit of the control device according to FIGS. 1 or 3 may further comprise a history buffer for storing a number of comparisons and an analysis circuitry. The analysis circuitry may then examine a number of unexpected events/errors within a given time interval or within a given number of comparisons. In this way, an error signal may be asserted based on an analysis of a number of unexpected events and relationships therebetween, rather than simply based on occurrence of one single unexpected event.

Figure 4:
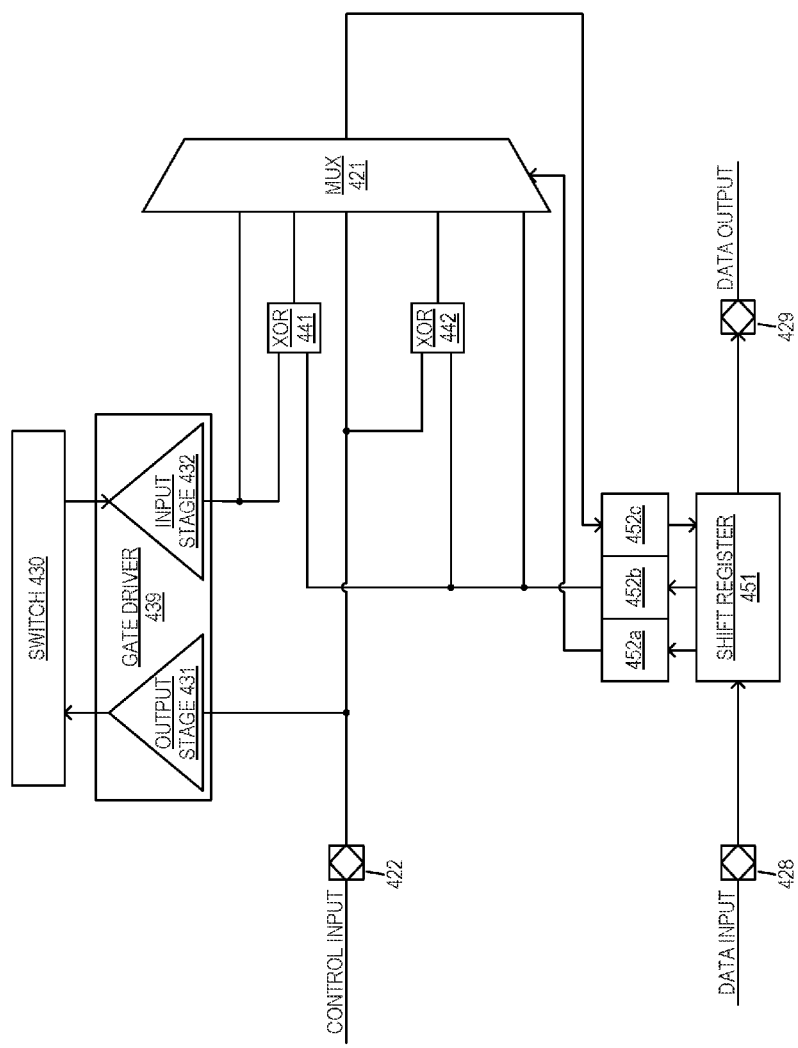
FIG. 4 exemplarily shows a simplified schematic diagram of a driver unit according to a further embodiment of the invention.

FIG. 4 exemplarily shows a simplified schematic diagram of a driver unit according to a further embodiment of the invention which is connected to an associated switch 430. The driver unit illustrated in FIG. 4 may be used in a system according to an alternative embodiment which has already been mentioned above briefly. In this embodiment, only one single-wire connection is provided for transmission of status and configuration data. Status and configuration data are transmitted in separate allocated time-slots of a data stream transmitted via the single-wire connection. Optionally, further data may be transmitted via the single-wire connection within further time-slots which are not allocated for transmission of status or configuration data.

The driver unit comprises a control signal input 422, a data input 428, a data output 429, a gate driver 439 comprising an output stage 431 and input stage 432 which are connected to the switch 430, shift register 451, registers 452a, 452b and 452c, a first logic gate 441, e.g., an XOR gate, having its inputs connected to the input stage 432 and register 452b and, a second logic gate 442, e.g., an XOR gate, having its inputs connected to the control input and register 452b, and multiplexer 421.

The shift register 451 serves as a receive/transmit register for a serial data stream and registers 452a, 452b and 452c are provided to hold data which is read out from the data stream received by the shift register 451 from the data input and data which is to be inserted in the serial data stream which is transmitted via the data output 429.

Register 452a receives and holds configuration data extracted from a first predefined location in the serial data stream and forwards the configuration data to the control input of the multiplexer 421.

Register 452b receives and holds status data, e.g., a status bit, extracted from a second predefined location in the serial data stream. The status data is forwarded to a first input of the multiplexer and the first inputs of the XOR gates 441 and 442.

The control data received at the control input 422 is forwarded to the output stage 431 to control the switch 430 and is also forwarded to a second input of the multiplexer 421 and a second input of the second XOR gate 442. The driver status data generated by the gate driver 439 is output to a third input of the multiplexer 421 and a second input of the first XOR gate 441. The output of the first XOR gate 441 is received by a fourth input of the multiplexer 421 and the output of the second XOR gate 442 is received by a fifth input of the multiplexer 421. The multiplexer outputs the data received at one of its five inputs based on the configuration data received at its control input.

The data output by the multiplexer 421 is forwarded to register 452c and further forwarded to the receive/transmit register (shift register) 451 to be inserted at a third predefined location in the serial data stream and be forwarded within the serial data stream.

In case the second and third predefined locations are the same, input status data is received at a certain specified (i.e., predefined) location in the serial data stream, modified (i.e., replaced by the output status data) and then forwarded within the serial data stream (at the same predefined location).

Also in this embodiment, the configurable feedback may be one of the following feedback signal types:

A) A signature signal based on a combination of all control signals received by the driver units;

B) One individual control signal received by one specific driver unit;

C) An individual driver status signal of a driver associated to one specific driver unit;

D) A status/signature signal based on a combination of all driver status signals generated by the gate drivers of the driver units.

The types A), B), and C) have already been described with reference to FIG. 1. Type D) is almost identical to type A), with the exception that instead of combining all control signals received by the driver units, all driver status signals generated by the gate drivers are combined. Thus, the multiplexers of all driver units are controlled to forward the output of the first XOR gate 441.

In the embodiment shown in FIG. 4, status and configuration data are transmitted in separate predefined locations or allocated time-slots of a data stream transmitted via the single-wire connection. Input status data and configuration data is extracted from the serial data stream at predefined locations and output status data is inserted in the serial data stream also at predefined location. The predefined locations or allocated time-slots may be located in the serial data stream, e.g., in relation to reference data contained in the serial data stream such as start of frame (SOF) or in relation to a signal received at another pin.

Optionally, further data may be transmitted via the single-wire connection within further time-slots which are not allocated for transmission of status or configuration data. Therefore, a single data line, e.g., single-wire connection, may be shared with other data communications using, e.g., time division multiplex transmission, i.e., dedicated time-slots are provided for the transmission of status or signature data. Feedback data may be provided in a time-discrete way in this embodiment.

Several examples for methods for signal comparison that may be used by the I/O comparator in the control device shown in FIG. 3 are discussed in the following with regard to FIGS. 5-12. While these methods are illustrated and described below as a series of acts or events, the present disclosure is not limited by the illustrated ordering of such acts or events. The same is true for other methods disclosed herein. For example, some acts may occur in different order and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases. It will be appreciated that the control devices described above with respect to FIGS. 1, 3 and 4 may include suitable hardware and/or software to implement these methods.

Figure 5:
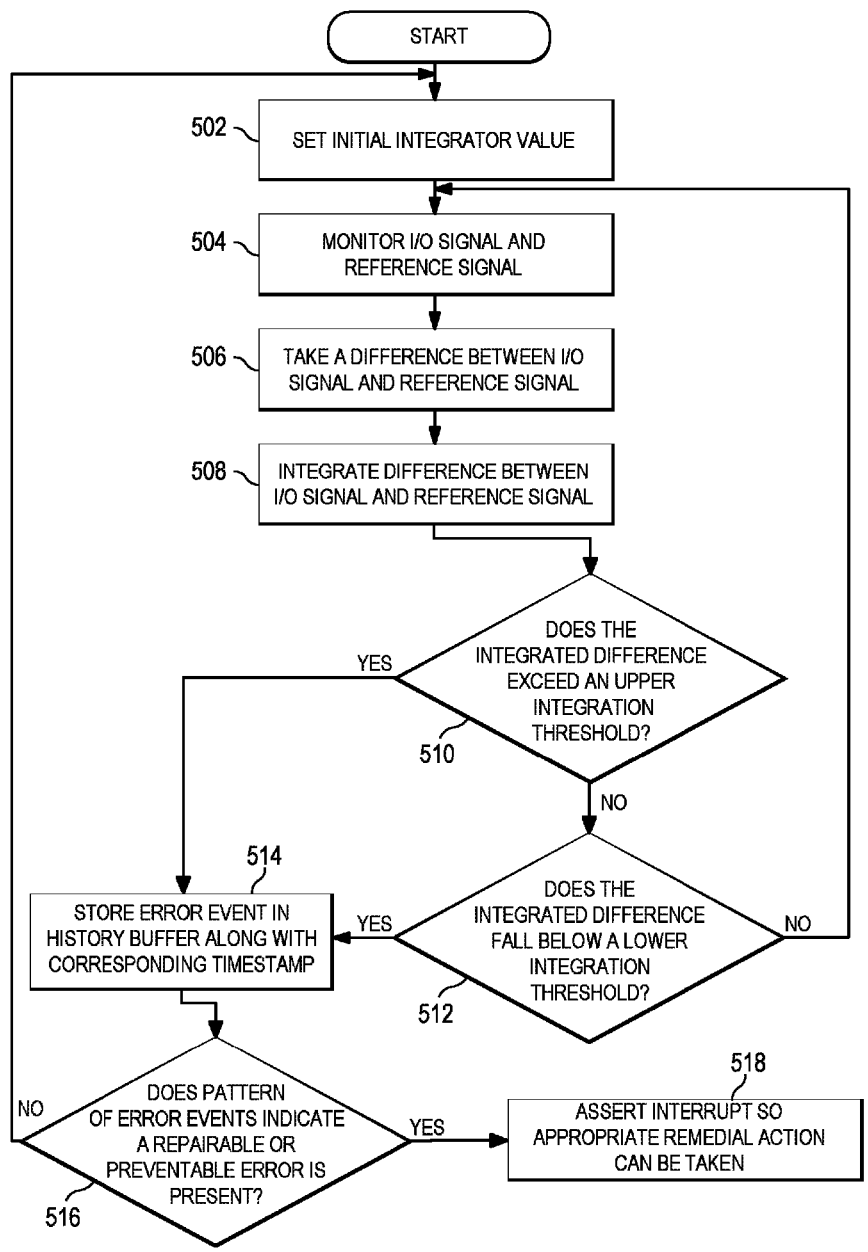
FIG. 5 is a flow chart depicting a method in which integration is used in accordance with some embodiments.

FIGS. 5-6 relate to timed I/O measurement techniques that utilize integration to determine whether an error has occurred. FIG. 5 shows a methodology in flowchart format, while FIG. 6 shows an example waveform consistent with the methodology of FIG. 5.

After setting an initial integrator value in 502, the method of FIG. 5 starts at 504 when voltage and/or current levels of an I/O signal and a reference signal are monitored.

At 506, the method takes a difference between the voltage or current level of the I/O signal and the voltage or current level of the reference signal. The difference is taken at a number of different times that are spread over a time period.

At 508, the method integrates the differences between the I/O signal and the reference signal over the time period.

At 510, the method determines whether the integrated difference exceeds an upper integration threshold. If not ("NO" at 510), the method continues to block 512 and determines whether the integrated difference falls below a lower integration threshold. If not ("NO" at 512), the method assumes no errors are present and continues processing the signals as shown in blocks 504-506.

However, if the integrated difference exceeds the upper integration threshold ("YES" at 510) or falls below the lower integration threshold ("YES" at 512), the method stores an error event and corresponding timestamp in the history buffer in block 514.

In 516, the method then analyzes the pattern of error events to determine whether a true error condition is present. For example, in some embodiments the timestamps of error events can be analyzed relative to other error event timestamps and an interrupt is only asserted if these errors are collectively indicative of a repairable error condition (e.g., a "bad" electrical connection or faulty transistor, which can be repaired and prevented in the future). In contrast, if the timestamps indicate the errors are random (e.g., due to alpha particles) the method may assign a different priority level to the error event, indicating that the error event is likely not repairable or preventable.

If a repairable or preventable error is detected, an interrupt request is generated by the I/O comparator at 518. Appropriate remedial action can be taken by a processor, for example, upon receipt of the interrupt. Otherwise, the process can return to block 502.

Figure 6A:
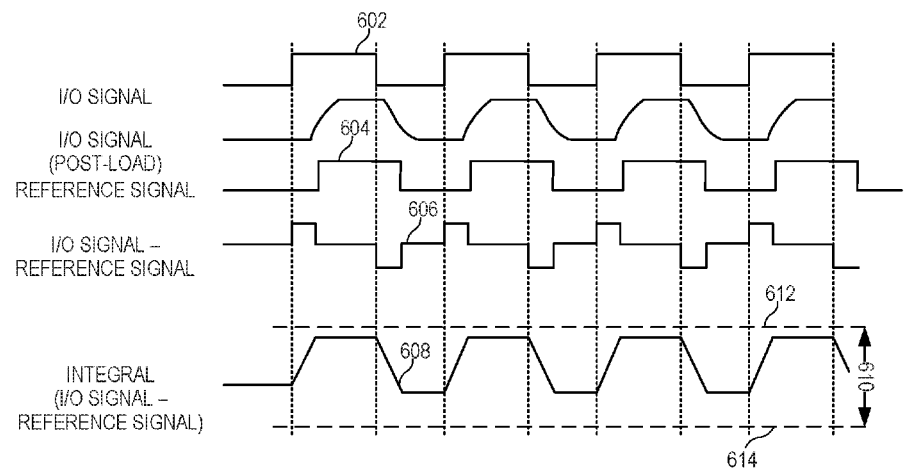
FIGS. 6A-6B show example waveforms to illustrate the flowchart of FIG. 5.
Figure 6B:
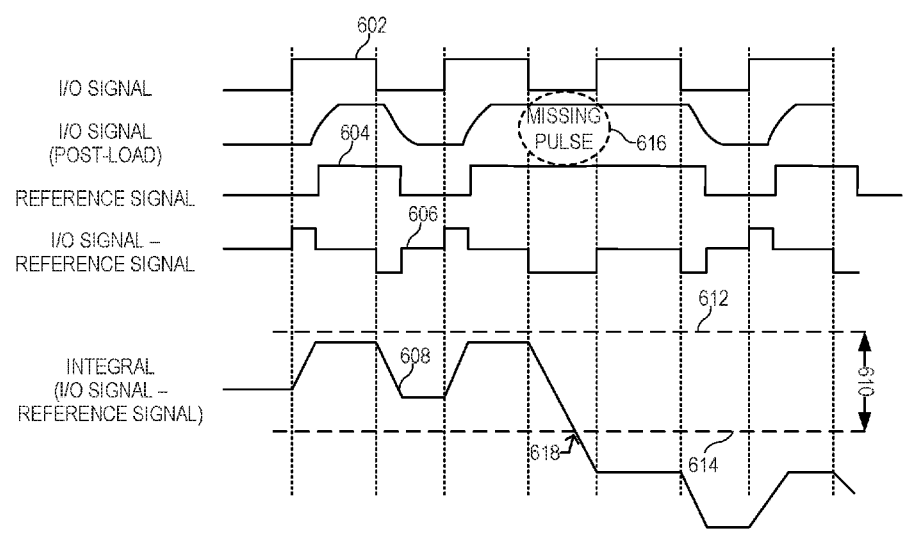

FIGS. 6A-6B shows a series of example waveforms consistent with the methodology of FIG. 5. As shown in FIGS. 6A-6B, the method takes a difference between the I/O signal 602 and reference signals 604, thereby generating a difference signal 606. The difference signal is integrated to provide an integrated difference waveform 608, and an error signal can be generated based on whether the integrated difference 608 has a predetermined relationship with an expected integration window 610. For example, an error can be asserted if the integrated difference 608 exceeds an upper integration threshold 612 or falls below a lower integration threshold 614. FIG. 6A shows normal operation where no errors are detected, while FIG. 6B shows an example wherein a missing pulse 616 in the I/O signal causes the integrated difference signal 608 to fall below the lower integration threshold 614 at time 618. Thus, in FIG. 6B an error event signal, such as an interrupt, can be generated so the error condition can be suitably dealt with.

Figure 7:
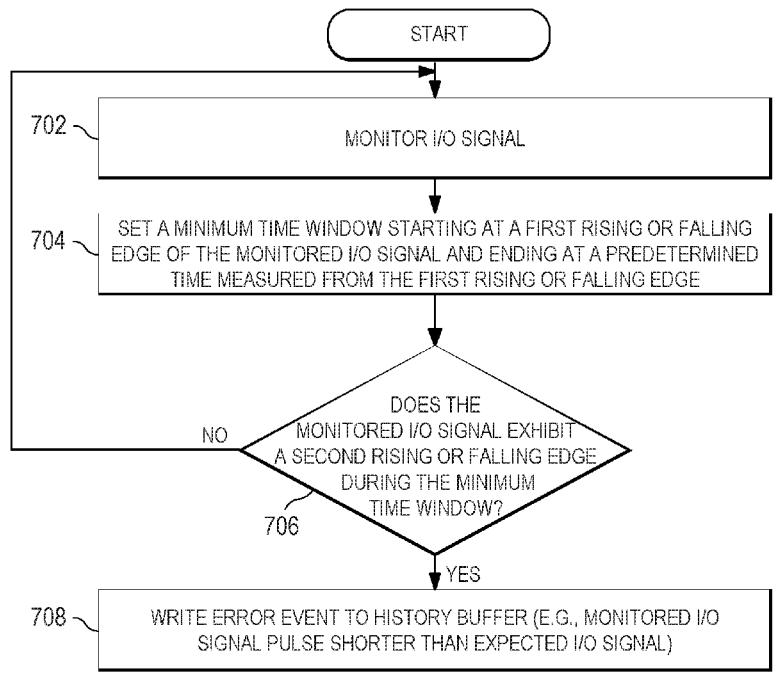
FIG. 7 is a flow chart depicting a method in which a minimum time window as measured from a rising or falling edge is utilized in accordance with some embodiments.
Figure 8:
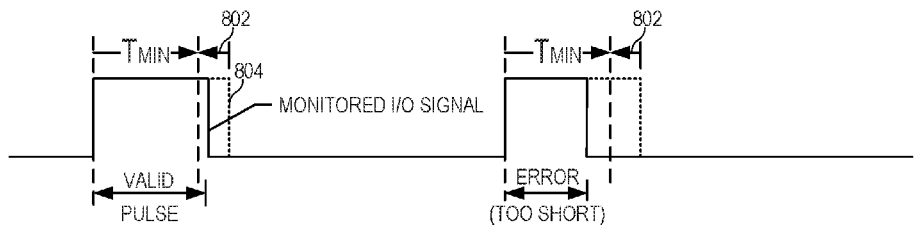
FIG. 8 shows some example waveforms to illustrate the flowchart of FIG. 7.

FIGS. 7-8 relate to timed I/O measurement techniques that utilize a time window to determine whether a timed signal is unacceptably shorter than expected. FIG. 7 shows a method in flowchart form, while FIG. 8 shows some sample waveforms consistent with the methodology of FIG. 7.

The method of FIG. 7, starts at 702, wherein an I/O signal is monitored.

At 704 the method sets a minimum time window (e.g., Tmin in FIG. 8), which starts at one type of edge (e.g., a first rising or falling edge of the monitored I/O signal) and ends at a predetermined time measured from the rising or falling edge. The end of the minimum time window corresponds to a maximum acceptable time deviation (e.g., 802, FIG. 8) from an expected I/O signal edge (e.g., FIG. 8, 804). In FIG. 8's example, the monitoring expected I/O signal edge is opposite (e.g., falling) with regards to the edge indicating the start of the time window (e.g., rising). In some instances, the same type of edge is used to start the window and to monitor the edge, and the pulse check is a frequency check. Although FIG. 8 only shows one check, it will be appreciated that a number of these checks can be carried out in parallel, with the length of the high or low time or frequency covering different failure mechanisms.

At 706 the method determines whether the monitored signal exhibits a second rising or falling edge during the minimum time window. If so ("YES" at 706) an error signal can be asserted in 708, otherwise monitoring can simply continue at 702-706. Note that the second edge need not be consecutive with the first edge, but rather can be a predetermined number of state changes removed from the first rising or falling edge.

As shown in the first portion of FIG. 8, if a second rising edge occurs within the maximum acceptable time deviation 802, the waveform pulse is considered to be a valid pulse. However, if a second rising edge occurs within the minimum time window Tmin (i.e., outside of the maximum acceptable time deviation 802), then an error is detected. In the example of FIG. 8, the error occurs because the monitored I/O signal is too short.

Figure 9:
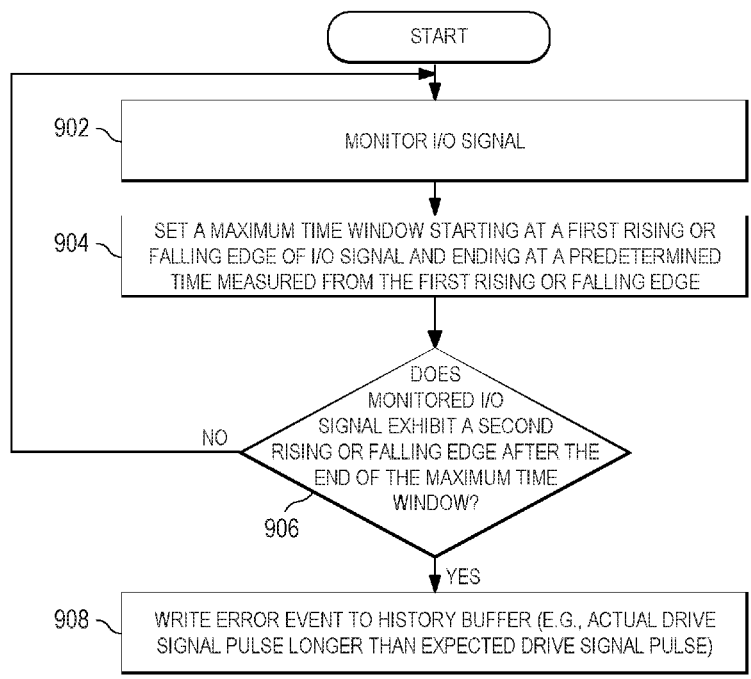
FIG. 9 is a flow chart depicting a method in which a maximum time window as measured from a rising or falling edge is utilized in accordance with some embodiments.
Figure 10:
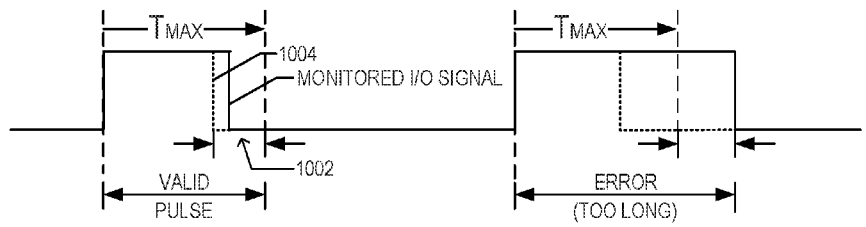
FIG. 10 shows some example waveforms to illustrate the flowchart of FIG. 9.

FIGS. 9-10 relate to timed I/O measurement techniques that utilize a time window to determine whether a timed signal is unacceptably longer than expected. The method of FIG. 9 starts at 902, wherein an I/O signal is monitored.

At 904 the method sets a maximum time window (e.g., Tmax in FIG. 10), which starts at a first rising or falling edge of the monitored I/O signal and ends at a predetermined time measured from the rising or falling edge. The end of the maximum time window corresponds to a maximum acceptable time deviation (e.g., 1002, FIG. 10) from an expected I/O signal edge (e.g., FIG. 10, 1004).

At 906 the method determines whether the monitored signal exhibits a second rising or falling edge beyond the maximum time window. If so ("YES" at 906) an error signal can be asserted in 908, otherwise monitoring can simply continue at 902-906. Note that the second edge need not be consecutive with the first edge, but rather can be a predetermined number of state changes removed from the first rising or falling edge.

As shown in the first portion of FIG. 10, if a second falling edge occurs within the maximum acceptable time deviation 1002, the waveform pulse is considered to be a valid pulse. However, if the second falling edge occurs after the end of the maximum time window Tmax (i.e., outside of the maximum acceptable time deviation 1002), then an error is detected. In the example of FIG. 10, the error occurs because the monitored I/O signal is too long.

Figure 11:
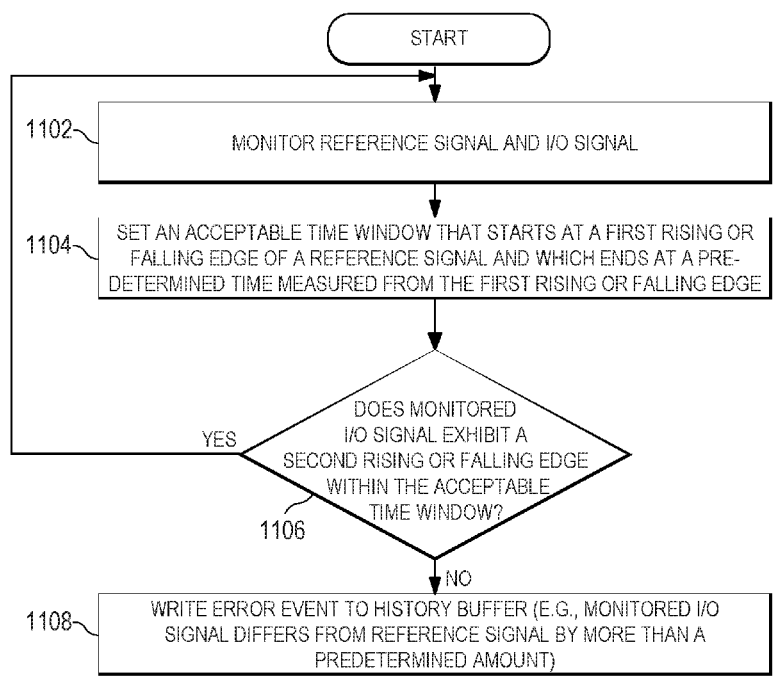
FIG. 11 is a flow chart depicting a method in which an I/O signal and reference signal are compared using a time window as measured from a rising or falling edge in accordance with some embodiments.
Figure 12:
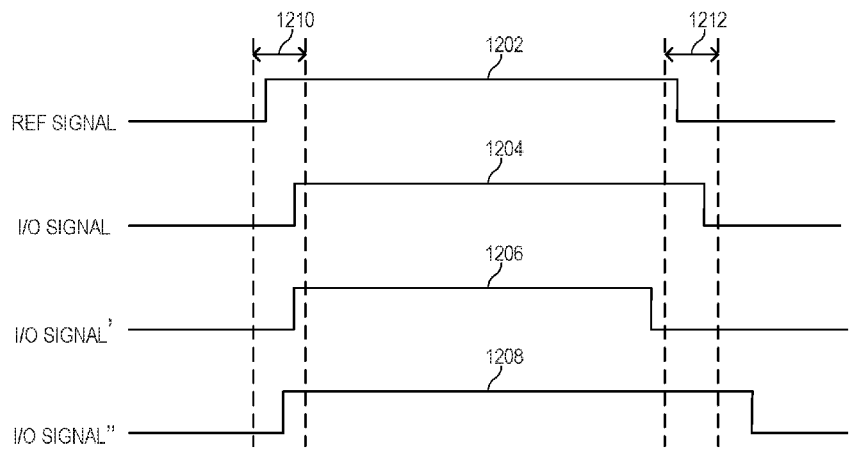
FIG. 12 shows some example waveforms to illustrate the flowchart of FIG. 11.

FIGS. 11-12 relate to a method that compare an I/O signal to a reference signal by using a time window.

At 1102 an I/O signal and a reference signal are monitored.

At 1104, the method sets an acceptable time window that starts at a first rising or falling edge of the reference signal and which ends at a predetermined time measured from the first rising or falling edge. The end of the time window corresponds to a maximum acceptable time deviation from an expected I/O signal.

At 1106, the method determines whether the monitored I/O signal exhibits a second rising or falling edge within the acceptable time window. If so ("YES" at 1106), it is assumed there is no error and monitoring continues at 1102-1106. If not ("NO" at 1108) an error signal is asserted.

For illustration, FIG. 12 shows a reference signal 1202 and several different examples of an I/O signal (1204, 1206, 1208). On edges of the reference signal, time windows (e.g., 1210, 1212) are opened. The edges of a given time window can be spaced (e.g., equally or non-equally) about the corresponding reference signal edge, and correspond to a maximum acceptable time deviation from the reference signal. In some instances (not-illustrated in FIG. 12), an edge of the time window can be aligned to the reference signal.

The edges of the first I/O signal 1204 fall within the time windows. Thus, signal 1204 is assumed to be error-free.

The first edge of the second I/O signal 1206 also falls within time window 1210. However, the second edge of the second I/O signal 1206 occurs before the start of the time window 1212. Thus, the second edge of the second I/O signal 1206 occurs too early, and an error signal can be asserted.

The first edge of the third I/O signal 1208 again falls within time window 1210. However, the second edge of the second I/O signal 1206 occurs after the start of the time window 1212. Thus, the second edge of the second I/O signal 1206 occurs too late, and an error signal can be asserted.

Figure 13:
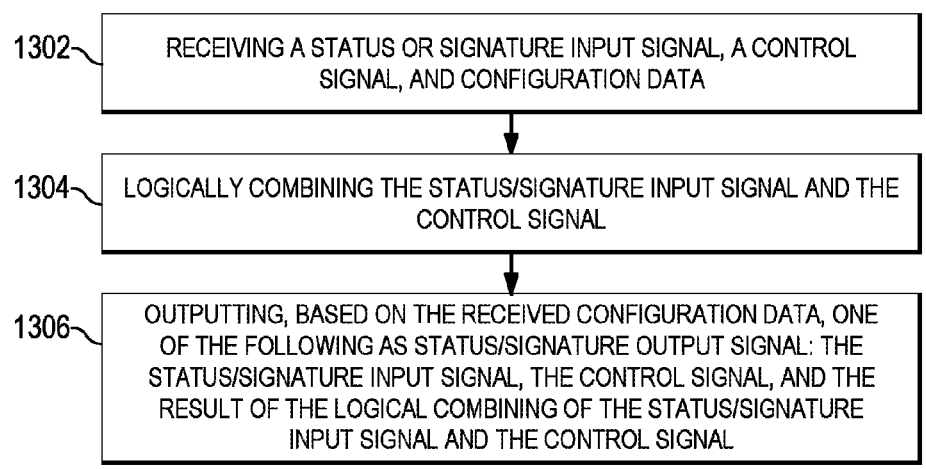
FIG. 13 shows a method for generating a configurable feedback according to a further embodiment of the invention.

FIG. 13 shows a method for generating a configurable feedback according to a further embodiment of the invention, wherein the method comprises the steps of:

receiving a status or signature input signal, a control signal, and configuration data (step 1302);

logically combining the status/signature input signal and the control signal (step 1304);

outputting, based on the received configuration data, one of the following as status/signature output signal: the status/signature input signal, the control signal, and the result of the logical combining of the status/signature input signal and the control signal (step 1306).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
a plurality of circuits coupled to a plurality of drivers and coupled to each other in a chain via a single-wire connection, each circuit configured to perform a plurality of operations;
control circuitry coupled to the plurality of circuits and configured to output configuration data to one circuit of the plurality of circuits to cause the one circuit to perform, based on the configuration data, a selected operation of the plurality of operations, wherein the plurality of operations comprises:
forwarding an output signal received from a precedent circuit to a next circuit in the chain via the single-wire connection without modification;
forwarding a control signal received by the one circuit to the next circuit in the chain via the single-wire connection;
outputting a driver status signal of a driver associated with the one circuit to the next circuit in the chain via the single-wire connection;
logically combining an output signal received from the precedent circuit and a control signal received by the one circuit and forwarding a result thereof to the next circuit in the chain via the single-wire connection; and
logically combining the output signal received from the precedent circuit and the driver status signal of the driver associated with the one circuit and forwarding a result thereof to the next circuit in the chain via the single-wire connection.

2. The system of claim 1, wherein the control circuitry is further configured to output individual configuration data to each circuit of the plurality of circuits to cause each respective circuit of the plurality of circuits to perform, based on the individual configuration data, one of the following operations:
forwarding an output signal received from the precedent circuit to the next circuit in the chain via the single-wire connection without modification;
forwarding a control signal received by the respective circuit as an output signal to the next circuit in the chain via the single-wire connection;
outputting a driver status signal of a driver associated with the respective circuit to the next circuit in the chain via the single-wire connection;
logically combining the output signal received from the precedent circuit and the control signal received by the respective circuit and forwarding a result thereof to the next circuit in the chain via the single-wire connection; or
logically combining the output signal received from the precedent circuit and the driver status signal of the driver associated with the respective circuit and forwarding a result thereof to the next circuit in the chain via the single-wire connection.

3. The system of claim 1, wherein a first circuit in the chain is configured to receive a predetermined signal as a starting signal.

4. A system for generating a configurable feedback, the system comprising:
a plurality of circuits coupled to a plurality of drivers and coupled to each other in a chain via a single-wire connection; and
a control circuit coupled to the plurality of circuits and configured to output configuration data to at least one circuit of the plurality of circuits to configure a feedback signal to be delivered by the plurality of circuits to the control circuit via the single-wire connection.

5. The system of claim 4, wherein each circuit is configured to receive a data stream from a precedent circuit via the single-wire connection, to modify a content of a predetermined location in the data stream and to output the modified data stream to a next circuit in the chain via the single-wire connection.

6. The system of claim 4, wherein each circuit is configured to receive a data stream from a precedent circuit via the single-wire connection, to extract status input data from a first predetermined location in the data stream, to insert status output data in a second predetermined location in the data stream and to output the data stream to a next circuit in the chain via the single-wire connection.

7. The system of claim 4, wherein the feedback signal either comprises information about an individual circuit and/or its associated driver, or comprises information about all circuits and/or all associated drivers.

8. The system of claim 4, wherein the configuration data either causes one circuit of the plurality of circuits to forward a control signal received by the one circuit or a driver status signal of a driver associated to the one circuit to a next circuit in the chain via the single-wire connection and all circuits subsequent to the one circuit in the chain to forward an output signal of a precedent circuit to the next circuit in the chain via the single-wire connection without modification; or
causes each of the circuits to logically combine the output signal of the precedent circuit and the control signal received by the respective circuit and forward a result thereof to the next circuit in the chain via the single-wire connection; or
causes each of the circuits to logically combine the output signal of the precedent circuit and the driver status signal of a driver associated to the respective circuit and forward a result thereof to the next circuit in the chain via the single-wire connection.

9. The system of claim 4, wherein each circuit of the plurality of circuits comprises:
an input node coupled to receive an input signal that comprises either an output signal of a circuit precedent in the chain of circuits or a starting signal;
a control signal input node coupled to receive a control signal;
an output node coupled to output an output signal;
a logic gate having inputs coupled to the input node and the control signal input node, the logic gate configured to logically combine the input signal and the control signal; and
a multiplexer comprising:
a control input;
a first input coupled to the input node;
a second input coupled to the control signal input node; and
a third input coupled to an output of the logic gate;
wherein the multiplexer is configured to output a signal received at one of its inputs to the output node based on configuration data received at the multiplexer control input.

10. The system of claim 9, wherein the multiplexer further comprises a fourth input coupled to receive a driver status signal of an associated driver.

11. The system of claim 10, wherein each circuit further comprises a further logic gate coupled to receive and logically combine the input signal and the driver status signal; and
wherein the multiplexer further comprises a fifth input coupled to an output of the further logic gate.

12. The system of claim 9, wherein the output node of each of the plurality of circuits, except a last circuit in the chain, is coupled to the input node of another circuit that is a next circuit in the chain via the single-wire connection.

13. The system of claim 12, wherein the input signal is extracted from a first predetermined location in a data stream received via the single-wire connection and the output signal is inserted in the data stream at a second predetermined location and transmitted within the data stream to the next circuit in the chain via the single-wire connection.

14. The circuit of claim 9, wherein the input signal is extracted from a first predetermined location in a data stream received at the input node and the output signal is inserted in the data stream at a second predetermined location.

15. The system of claim 9, wherein the logic gate comprises an XOR gate.

16. The system of claim 4, wherein each circuit of the plurality of circuits comprises essentially the same circuit design.

17. The system of claim 4, wherein a circuit of the plurality of circuits comprises:
   an input node coupled to receive an input signal;
   a control signal input node coupled to receive a control signal;
   an output node;
   a first logic gate having a first input coupled to the input node and a second input coupled to the control signal input node, the first logic gate configured to logically combine the input signal and the control signal;
   a second logic gate having a first input coupled to the input node and a second input to be coupled to receive a driver status signal from a driver, the second logic gate configured to logically combine the input signal and the driver status signal; and
   a multiplexer comprising:
      a control input;
      a first input coupled to the input node;
      a second input coupled to the control signal input node;
      a third input coupled to receive the driver status signal;
      a fourth input coupled to an output of the first logic gate; and
      a fifth input coupled to an output of the second logic gate,
      wherein the multiplexer is configured to output a signal received at one of the multiplexer inputs to the output node based on configuration data received at the control input.

18. The system of claim 4, further comprising a first XOR logic gate and a second XOR logic gate.

19. A method for generating a configurable feedback, the method comprising:
   receiving a status input signal;
   receiving a control signal;
   receiving configuration data;
   logically combining the status input signal and the control signal; and
   outputting, based on the received configuration data, one of the following as a status
   outputting signal: the status input signal, the control signal, or a result of the logical combining of the status input signal and the control signal.

20. The method of claim 19, wherein the status input signal is received within a data stream and extracted from the data stream at a first predetermined location in the data stream, and wherein the status output signal is inserted at a second predetermined location in the data stream and forwarded within the data stream.

21. The method of claim 20, wherein the configuration data is also received within the data stream and extracted from the data stream at a third predetermined location in the data stream.

22. The method of claim 19, further comprising:
   writing a result of the combining in a history buffer.

* * * * *

UNITED STATES PATENT AND TRADEMARK OFFICE
CERTIFICATE OF CORRECTION

| | | |
|---|---|---|
| PATENT NO. | : 9,442,478 B2 | Page 1 of 1 |
| APPLICATION NO. | : 13/308054 | |
| DATED | : September 13, 2016 | |
| INVENTOR(S) | : Barrenscheen et al. | |

It is certified that error appears in the above-identified patent and that said Letters Patent is hereby corrected as shown below:

In the Claims

Column 17, Line 5, Claim 14, delete "The circuit" and insert --The system--.

Column 18, Line 19, Claim 19, delete "outputting" and insert --output--.

Signed and Sealed this
Third Day of January, 2017

Michelle K. Lee
*Director of the United States Patent and Trademark Office*